(12) United States Patent
Li et al.

(10) Patent No.: US 6,532,500 B1
(45) Date of Patent: Mar. 11, 2003

(54) SYSTEM AND METHOD TO SUPPORT OUT-BAND STORAGE SUBSYSTEM MANAGEMENT VIA SCSI BUS WHEN OPERATING POWER TO A COMPUTER SYSTEM IS OFF

(75) Inventors: Shaojie Li, Austin, TX (US); Truc Nguyen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/490,335

(22) Filed: Jan. 24, 2000

(51) Int. Cl.[7] .......................... G06F 13/38; G06F 11/30
(52) U.S. Cl. ..................... 710/15; 710/38; 710/316; 714/27; 714/31
(58) Field of Search .................... 710/14–16, 18, 710/36–38, 305, 316; 713/300, 340; 714/25, 27, 31; 709/223, 224

(56) References Cited

U.S. PATENT DOCUMENTS

| | | | | |
|---|---|---|---|---|
| 5,636,342 A | | 6/1997 | Jeffries | 395/185.01 |
| 5,757,642 A | | 5/1998 | Jones | 364/134 |
| 5,758,171 A | * | 5/1998 | Ramamurthy et al. | 713/300 |
| 5,815,652 A | * | 9/1998 | Ote et al. | 714/31 |
| 5,966,510 A | * | 10/1999 | Carbonneau et al. | 714/44 |
| 6,286,107 B1 | * | 9/2001 | Tamaki et al. | 713/320 |
| 6,381,636 B1 | * | 4/2002 | Cromer et al. | 709/211 |
| 6,463,499 B1 | * | 8/2002 | Wakeley | 710/315 |

* cited by examiner

Primary Examiner—Jeffrey Gaffin
Assistant Examiner—Ilwoo Park
(74) Attorney, Agent, or Firm—Baker Botts L.L.P.

(57) ABSTRACT

A first data bus is coupled to communicate information from a subsystem for sensing operating parameters of peripheral components to a computer system. A second data bus is coupled to communicate data between peripheral components and the computer system. A first switch is coupled between the first data bus and the second data bus, the first switch being operable to allow signals from the first data bus to be communicated over the second data bus when operating power to the computer system is powered off. A second switch is coupled between the second data bus and the peripheral components, and the second switch is operable to allow signals from the second data bus to be communicated to the computer system when operating power to the computer system is powered on.

30 Claims, 4 Drawing Sheets

SYSTEM AND METHOD TO SUPPORT OUT-BAND STORAGE SUBSYSTEM MANAGEMENT VIA SCSI BUS WHEN OPERATING POWER TO A COMPUTER SYSTEM IS OFF

BACKGROUND OF THE INVENTION

1. Field of the Invention

This invention relates generally to management of external devices in computer server systems. More specifically, this invention relates to a system and method for monitoring external devices in a computer server in both operational and power-off conditions.

2. Description of the Related Art

In the server management industry, it is desired to manage all of the internal devices of computer systems, as well as the external small computer systems interface (SCSI) devices such as SCSI storage subsystems at all times, regardless of whether the computer system is in a power-up state. The SCSI Accessed Fault-Tolerant Enclosures (SAF-TE) specification provides a standardized method to monitor and report status information on the condition of disk drives, power supplies and cooling systems used in high-availability servers and storage subsystems. In contrast to monitoring component status through serial lines or reserved SCSI signaling methods, a SAF-TE-compliant enclosure typically implements the enclosure as an assignable SCSI target identification using a SCSI chip and microcontroller. The microcontroller is used to control various alarm sensors, status lights, and displays within the enclosure. The enclosure's SCSI target ID is polled periodically by the SCSI controller to determine status, thereby allowing rapid notification in the event fault tolerance is lost due to component failure. The SAF-TE specification provides information about drive presence, conditioning of drive slots for insertion or removal, power-supply voltage, fan speed, door-lock status, and drive-usage statistics.

Most microprocessor-based computer server systems include an embedded management controller (EMC) connected to a host central processing unit (CPU) through a local bus. The EMC is used to control various internal and external components such as thermal sensors, fans, disk drives, and a SCSI backplane.

The EMC operates on system power when the computer system is powered up, and on standby power when the computer system is powered down. The problem is that the SCSI support is only available when the computer is up and running. When the system is powered down, the management information for the external SCSI components cannot be accessed.

It is therefore desirable to provide a system for monitoring external peripheral components connected to the computer system at all times.

SUMMARY

In one embodiment, the present invention provides a method of monitoring peripheral devices connected to a computer system that includes coupling a first data bus to communicate information between an external monitoring system and the computer system; coupling a second data bus to communicate data between a peripheral device and the computer system; and coupling a switch mechanism between the first data bus and the second data bus, the switch mechanism being operable to allow signals from the first data bus to be communicated over the second data bus when operating power to the computer system is off.

In one embodiment, coupling the switch mechanism includes coupling a first switch between the first data bus and the second data bus; and coupling a second switch to inhibit communication between the peripheral device and the computer system when operating power to the computer system is off.

In another embodiment, the first data bus is a serial data bus, such as an $I^2C$ bus, that transmits a data signal and a clock signal, and the second data bus is a parallel data bus, such as a SCSI bus. The first switch and the second switch are coupled to allow the data, clock, and ground signals to be transmitted over the second data bus when the first switch is on and the second switch is off.

One application for the present invention includes monitoring operating parameters in an external subsystem coupled to a computer system when the computer system is not receiving operating power. System management information is communicated from the external subsystem to a monitoring component in the computer system over the second bus when the computer system is receiving operating power. When the computer system is not receiving operating power, the operating parameters are communicated to the computer system over the first data bus.

To accomplish this in one embodiment, a first switch is coupled between the first data bus and the second data bus; and a second switch is coupled between the peripheral components and the second data bus. The first switch is controlled to allow signals from the first data bus to be communicated to the computer system when operating power to the computer system is off, and the second switch is controlled to inhibit communication from the peripheral device on the second data bus when operating power to the computer system is off.

In a further embodiment, a third switch is coupled between the second data bus and the monitoring component; and communication from the second data bus to the computer system is inhibited when operating power to the computer system is off by coupling a fourth switch between the second data bus and the computer system.

The method, as set forth in claim 10, wherein the first data bus is a serial data bus that transmits a data signal and a clock signal.

In another embodiment, the present invention provides an apparatus for monitoring a computer system including a first data bus coupled to communicate information from one or more monitoring systems in the computer system, a second data bus coupled to communicate information from one or more peripheral devices in the computer system, and a switch mechanism coupled between the first data bus and the second data bus. The switch mechanism is controlled to allow signals from the first data bus to be communicated over the second data bus when operating power to the computer system is off.

In another embodiment of the apparatus, the switch mechanism includes a first switch connected between the first data bus and the second data bus, and a second switch connected to inhibit communication from the peripheral devices in the computer system when operating power to the computer system is off. The first switch and the second switch are coupled to allow all required signals, such as a data, clock, and ground signal, to be transmitted over the second data bus when the first switch is on and the second switch is off.

The present invention may be used to transmit a data signal and a clock signal from a serial bus over a parallel data bus so that external peripheral components may be monitored by an EMC that is operating on standby power.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Figure 1:
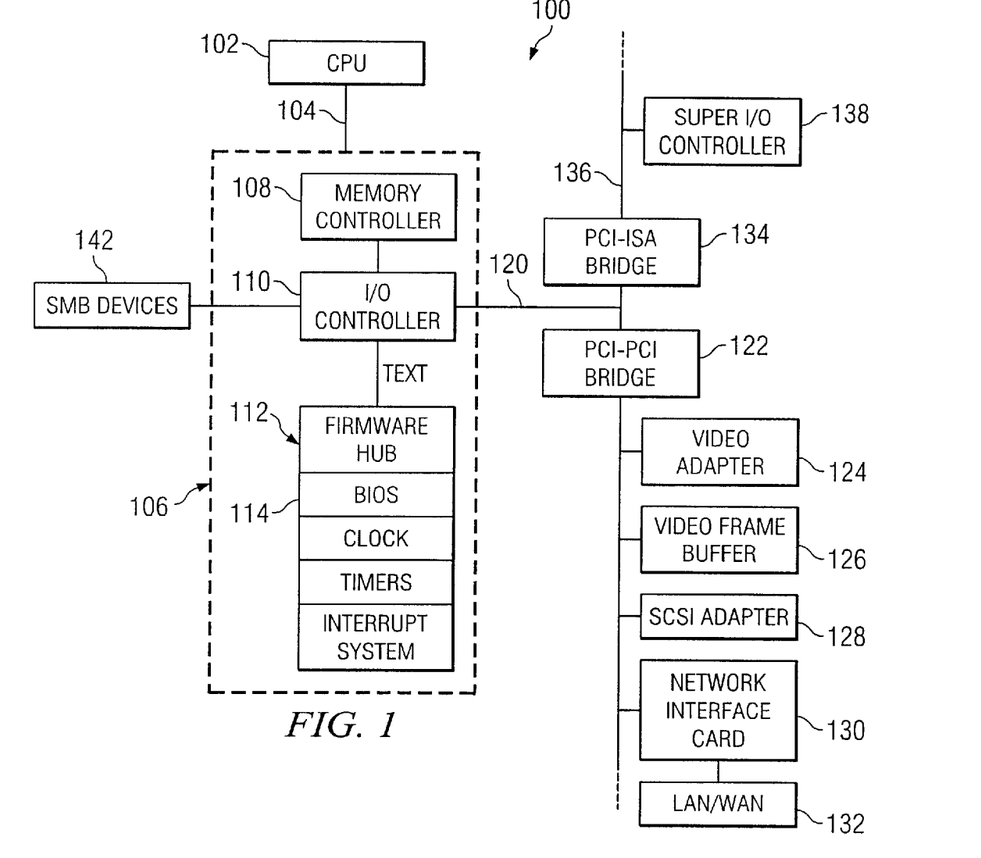
FIG. 1 is a block diagram of a prior art computer system with which the present invention may be utilized.

The present invention can be implemented on a general purpose computer system 100, such as illustrated in FIG. 1, that incorporates a plurality of buses or other communications media. Computer system 100 is suitable for implementing a system and method for providing system management information via a system management bus or an alternate bus depending on operating power status. The system and operating method for transmitting serial data information via a parallel data bus may be used with various types of serial and parallel data buses and may be incorporated into any type of computer system.

As shown in FIG. 1, computer system 100 includes host processor 102 such as a central processing unit (CPU) which is connected through processor local bus 104 to chipset 106. Memory controller 108, input/output (I/O) controller 110, and firmware hub 112 are included in chipset 106. Firmware hub 112 includes an interrupt system, a real time clock (RTC) and timers, a direct memory access (DMA) system, ROM/Flash memory, communications ports, diagnostics ports, command/status registers, and non-volatile static random access memory (NVSRAM). Firmware hub 112 stores system and video basic input/output systems (BIOS) 114, generates random numbers for security features, provides register-based read and write protection for code/data storage blocks, and includes a command user interface (CUI) for requesting access to locking, programming, and erasing options in firmware hub 112. The CUI also handles requests for data residing in status, identification, and block lock registers. BIOS 114 supports capabilities, such as plug and play, that automatically update system parameters and software when hardware is added or changed in computer system 100.

I/O controller 110 interfaces to peripheral component interconnect (PCI) bus 120. Various types of devices are connected to PCI bus 120 through PCI-PCI bridge 122. In the embodiment shown in FIG. 1, video adapter 124 and video frame buffer 126 are connected for controlling video functions. One or more SCSI (small computer systems interface) adapters 128 are connected to provide an interface to SCSI devices such as disk drives, CD-ROM drives, scanners, printers, and other input/output devices. In the illustrative embodiment, various other devices may be connected to PCI-PCI bridge 122, such as network interface card 130 to interface computer system 100 with local area network (LAN) and/or wide area network (WAN) 132.

PCI bus 120 is also connected to PCI-ISA bridge 134, which provides an interface to expansion bus 136, such as an industry standard architecture (ISA) expansion bus, the extended industry standard architecture (EISA) bus, or the microchannel architecture (MCA) bus. Various devices (not shown) may be connected to expansion bus 136 through super I/O controller 138 including expansion bus memory, a keyboard, a floppy disk drive, a mouse, a modem, and/or an infrared I/O device.

Computer system 100 includes system management bus (SMB) devices 142, which provide signals representing operating parameters of various devices in computer system 100. Examples of SMB devices 142 include thermal sensors, voltage/current monitoring circuits, fan monitoring circuits, control panel consoles for displaying the status of the disk drives, and power supply monitors for monitoring and reporting the status of the power supply in the system. The monitoring cards monitor system parameters such as temperature and voltages of components within computer system 100. For example, if the temperature and/or certain measured voltages of one or more drives are not within predefined tolerances, the respective monitoring card sounds an alarm, which may include turning on LEDs within the respective control panel console or outputting sound on a speaker. In other embodiments, other types of monitoring cards may be employed that monitor other system parameters and/or perform other functions. In the illustrative embodiment, SMB device 142 may include an information processing unit, such as a microcontroller. The various SMB devices 142 operate without involvement of host processor 102 and operate independently of the operating system.

SMB devices generally perform control functions that do not require high speed data transfer capabilities. Therefore SMB devices 142 are typically coupled to I/O controller 110 sing a serial data bus, such as the Phillips I$^2$C serial bus, at the electrical level and the protocol level. The I$^2$C bus comprises three lines including a serial data line (not shown), a clock line (not shown), and a ground wire (not shown). Each SMB device 142 connected to the I$^2$C bus includes an open collector or dot-or connection to the data line. Thus, if SMB device 142 desires to transmit a logical zero on the data line, it pulls the line low. The SMB device 142 transmits a logical high value on the bus by simply floating the bus high using a pull-up resistor, i.e., not driving the bus. For more information on the Phillips I$^2$C serial bus, please see the Signetics I$^2$C Peripherals for Microcontrollers Handbook, published January 1992, which is hereby incorporated by reference in its entirety.

In the embodiment shown, computer system 100 is a computer server that enables a plurality of computer systems such as personal computer systems (not shown) operably coupled to the computer server to store and retrieve data on a data storage subsystem 304. The personal computer systems (not shown) are operably coupled to computer system 100 via computer networks such as local area network (LAN) and/or wide area network (WAN) 132, and/or a global information network (not shown) such as the Internet through a network interface card 130.

Figure 1A:
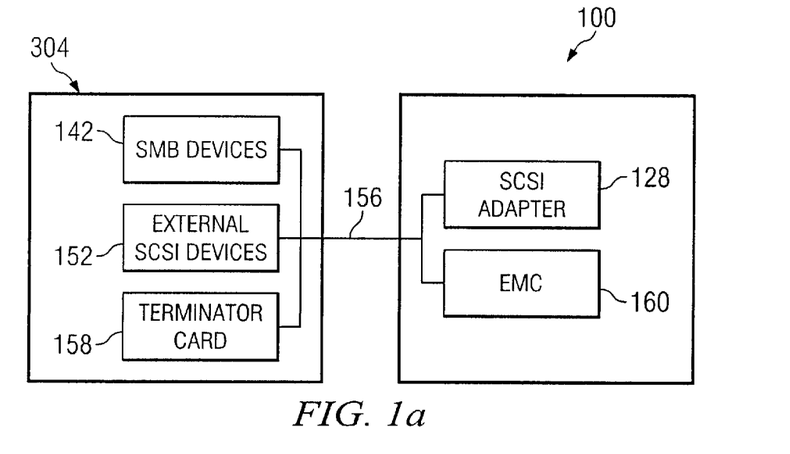
FIG. 1A is a block diagram of a computer system in accordance with the present invention.

FIG. 1a shows an example of a single channel SCSI bus topology having SCSI adapter 128 connected to and external SCSI devices 152 by external SCSI bus 156. External SCSI bus 156 conforms to a SCSI standard architecture, such as the SCSI-1, SCSI-2, or SCSI-3 standard architectures or any other standards based upon the SCSI standards. It is understood that the term "SCSI bus" refers to a bus that conforms to a SCSI standard or any bus standard based upon a SCSI standard.

The SCSI standards specify the parameters for implementing and operating a computer system bus. The standards specify the cable type and length, the operating speeds, the addressing schemes, and the signaling protocol utilized on the bus. The SCSI standards also specify type, number, and function of the signals utilized by a SCSI bus including control signals and data signals. SCSI devices are connected together by daisy-chaining from SCSI adapter 128 to each SCSI device. One or more SCSI adapters 128 may be included in computer system 100. SCSI bus 156 is terminated at terminator card 158 to prevent spurious signals from bouncing back and forth on SCSI bus 156. One type of standard SCSI signal specified by the SCSI standards is the termination power signal, which is also referred to as the TERMPWR signal. Other specified SCSI signals for one SCSI standard include SCSI data signals DB0-7 (data bits 0–7), DBP (Parity), and SCSI control signals ATN (attention), BSY (busy), ACK (acknowledge), RST (reset), MSG (message), SEL (select), C-D (command data), REQ (request), I-O (input-output data direction), and various GND (ground) signals.

In one embodiment, EMC 160 is configured as a separate dedicated microcontroller. It is noted that various other configurations may be used, as desired. EMC 160 operates on system power when computer system 100 is powered up, and on standby power when computer system 100 is powered down. When computer system 100 is powered down, the management information of the external components cannot be accessed.

Referring to FIGS. 1 and 1a, the SCSI controller (not shown) transmits and receives the SCSI signals that enable computer system 100 to communicate with SCSI devices 150, 152. In one embodiment, computer system 100 communicates with the SCSI controller via PCI bus 120 conforming to the PCI standard architecture.

In one embodiment, external SCSI devices 152 form data storage subsystems 304 that include a scalable number data storage devices operably coupled to SCSI bus 156. SCSI devices 152 are storage devices, such as hard disk drives. In other embodiments, other types of SCSI compatible data storage devices may be used such as tape drives or CD ROMs. External SCSI devices 152 are connected to external SCSI bus 156 external to the chassis housing. SCSI bus 156 may be implemented on a SCSI backplane in the SCSI storage enclosure. The SCSI backplane includes a number of SCSI physical connectors for coupling SCSI devices 152 to SCSI bus 156. In one embodiment, SCSI devices 152 may include electrically controllable peripheral connector circuits that are used to operably couple and isolate peripheral data storage devices to shared SCSI busses. In some embodiments, the peripheral connector circuits allow the data storage devices to be "hot-pluggable."

One skilled in the art will recognize that the foregoing components and devices are used as examples for sake of conceptual clarity and that various configuration modifications are common. Consequently, as used herein the specific exemplar set forth in FIGS. 1 and 1a are intended to be representative of their more general classes. In general, use of any specific exemplar herein is also intended to be representative of its class and the non-inclusion of such specific devices in the foregoing description should not be taken as indicating that limitation is desired.

SMB 142 and SCSI bus 156 are coupled to communicate with EMC 160. During operation, EMC 160 is supplied with operating power $V_A$ from an external source such as an electrical outlet, or an internal source such as a battery. SMB bus 162, external SCSI bus 156, and EMC 160 operate on system power when computer system 100 is powered up. When the system is powered down, SMB 162 and EMC 160 operate on standby power. External SCSI bus 156 does not receive power, however, and the management information for components connected to external SCSI devices 152 cannot be accessed. It is desirable to temperature, power, and other operating conditions for external SCSI devices 152 since external SCSI devices 152 may be receiving operating power even when computer system 100 is not due to independent power supplies.

Figure 2:
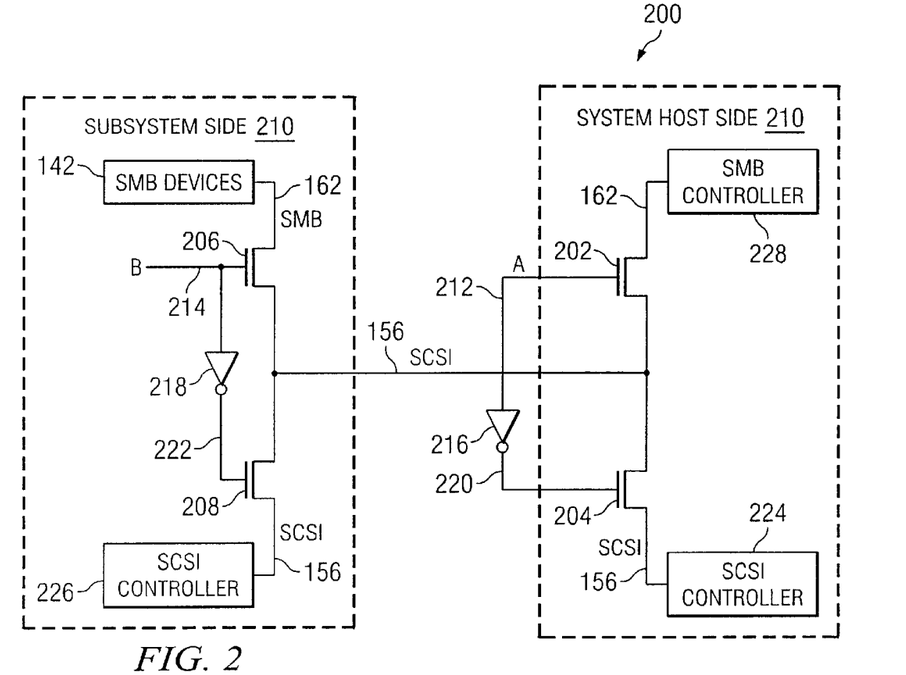
FIG. 2 is a schematic diagram of a circuit for monitoring components in a computer system in accordance with one embodiment of the present invention.

FIG. 2 shows an embodiment of the present invention for switching circuit 200 capable of routing a signal to the internal channel of SCSI bus 15G when computer system 100 (FIG. 1) is receiving operating power $V_A$, and for rerouting the signal from external SCSI bus 156 to SMB 162 when computer system 100 (FIG. 1) is not receiving operating power $V_A$. The present invention includes switches 202, 204 coupled to computer system 100 and switches 206, 208 coupled to external subsystem 210. Switches 202 through 208 may be implemented using one of several known switching devices such as one or more of various types of electronic transistors. Alternately, switches 202 through 208 may be implemented using other types of hardware, or a combination of hardware and software.

When computer system 100 is receiving operating power $V_A$, input signal 212 to switch 202 is driven low. Input signal 214 to switch 206 is also driven low. Inverters 216, 218 invert input signals 212, 214, respectively, to form input signals 220, 222 to switches 204, 208, respectively. Thus, when input signals 212, 214 are driven low (OFF), input signals 220, 222 are driven high (ON), and switches 204, 208 conduct signals between SCSI controllers 224 and 226 over SCSI bus 156. In one embodiment, input signal 212 is generated within computer system 100 to reflect the status of operating power $V_A$, i.e., whether operating power is being received by computer system 100. Input signal 214 is generated in subsystem 304 and corresponds to input signal 212. In one embodiment, input signal is generated based on the TERMPWR signal that is transmitted to subsystem 304 by SCSI controller 224 via SCSI bus 156.

Similarly, when computer system 100 is not receiving operating power $V_A$, input signals 212, 214 are driven high (ON), and input signals 220, 222 are driven low (OFF) by inverters 216, 218. In this situation, switches 204, 208 block signals between SCSI controllers 224, 226 on SCSI bus 156. Further, switches 202, 206 are switched ON to conduct signals between SMB devices in subsystem 210 and SMB controller 228.

In one embodiment, the present invention utilizes a status register (not shown) to store a value indicating whether operating power is being received by computer system 100. EMC 160 (FIG. 1a) uses this value to determine when to drive input signals 212, 214 high to access signals from SMB devices 142 via SCSI bus 156.

Figure 3:
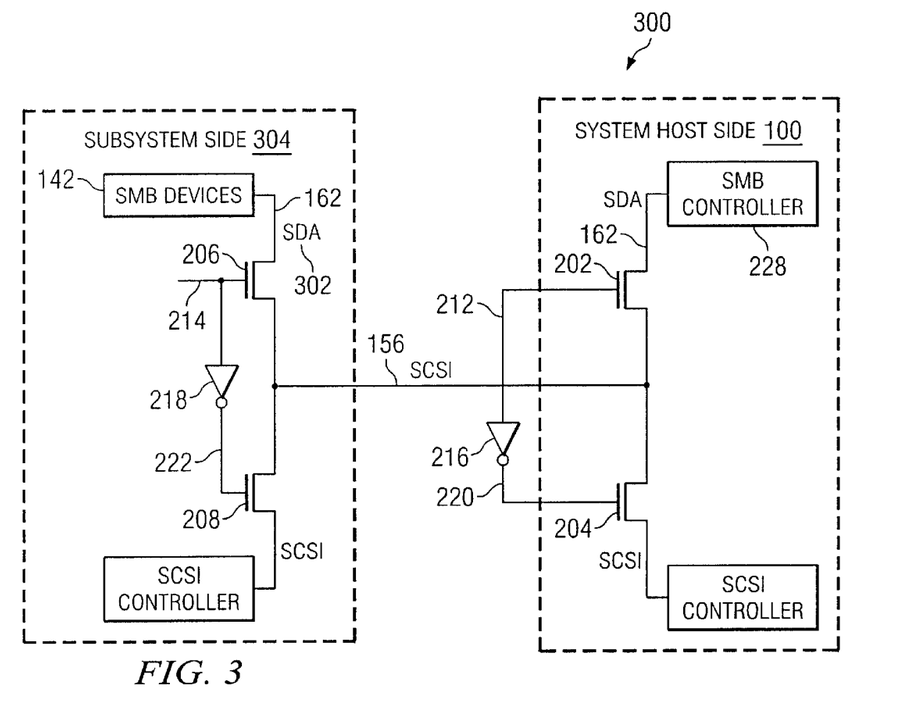
FIG. 3 is a schematic diagram of a circuit for monitoring components in a computer system in accordance with the present invention.
Figure 4:
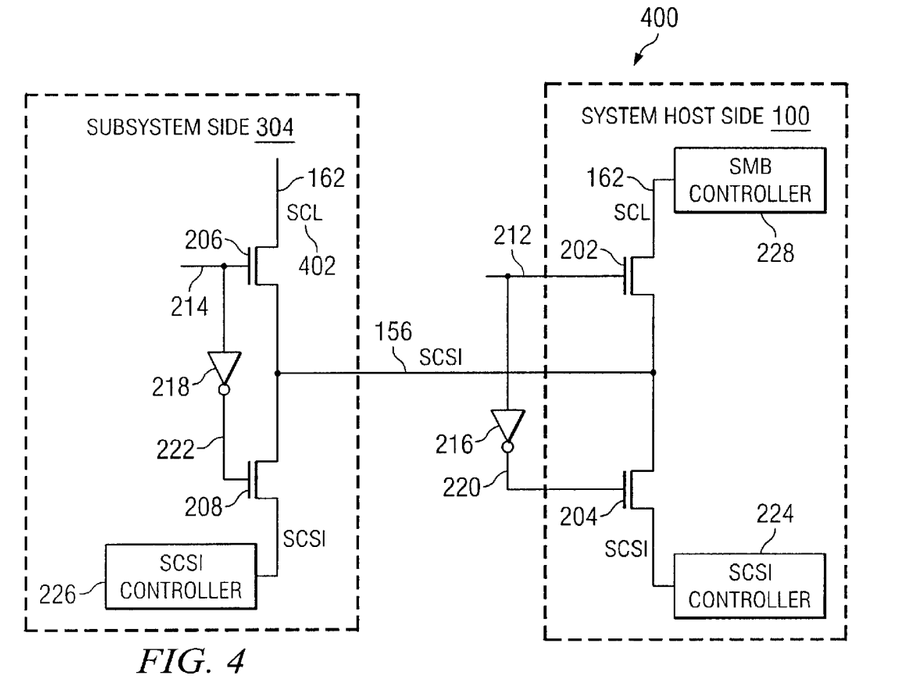
FIG. 4 is a schematic diagram of a circuit for monitoring components in a computer system in accordance with the present invention.
Figure 5:
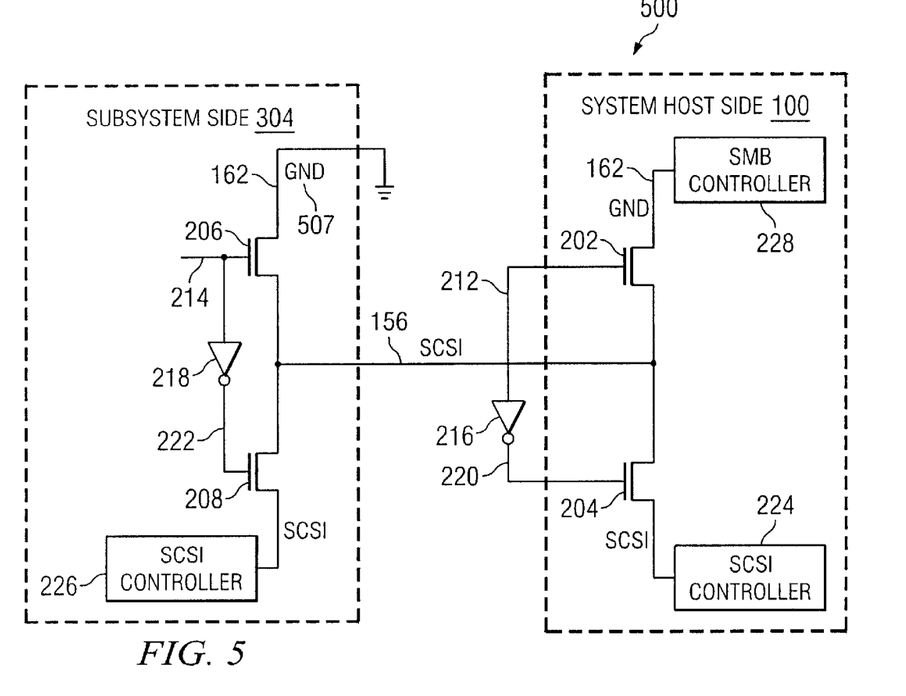
FIG. 5 is a schematic diagram of a circuit for monitoring components in a computer system in accordance with the present invention.

It is important to note that in one embodiment, one switching circuit is required for each type of signal that is communicated between subsystem 210 and computer system 100. For example, FIGS. 3, 4, and 5 show an embodiment of the present invention for conducting data via SMB 162, which conforms to I²C bus standards. The I²C bus data signals that are transmitted between subsystem 304 and computer system 100 include data, clock, and ground signals.

In the embodiment shown in FIGS. 3, 4, and 5, the topology and operation of switching circuits 300, 400, and 500 is similar to switching circuit 200 in FIG. 2, as described hereinabove. Specifically, FIG. 3 shows switching circuit 300 where data signal 302 is conducted between subsystem 304 and SMB controller 228 via SCSI bus 156 when computer system 100 is not receiving operating power $V_A$. Similarly, FIG. 4 shows switching circuit 400 which conducts clock signal 402 between subsystem 304 and SMB controller 228, and switching circuit 500 in FIG. 5 couples ground signal 502 between subsystem 304 and SMB controller 228, via SMB 162 and SCSI bus 156 when computer system 100 is not receiving operating power.

Note that in the embodiment of the present invention shown in FIGS. 3, 4, and 5, input signals 212, 214 to switches 202, 206, respectively, are driven low when computer system 100 is receiving operating power $V_A$. Inverters 216, 218 invert input signals 212, 214, respectively, to form input signals 220, 222 to switches 204, 208, respectively. Input signals 220, 222 are driven high (ON) when input signals 212, 214 are driven low (OFF), and switches 204, 208 conduct signals between SCSI controllers 224 and 226 over SCSI bus 156.

While the embodiment of the present invention shown in FIGS. 3, 4, and 5 dedicates one switching circuit 300, 400, 500 to each of data signals 302, 402, 502, respectively, another embodiment of the present invention may use only one set of switches coupled to a mechanism for transmitting data signals 302, 402, 502 to one switching circuit on an alternating basis. This would reduce the number of switching circuits required to implement the present invention. Additionally, two or more switching circuits may be utilized, depending on the number of signals to be communicated and the bandwidth requirements of subsystem 304 and computer system 100. Such a mechanism may be implemented in hardware, software, or a combination of hardware and software.

Figure 6:
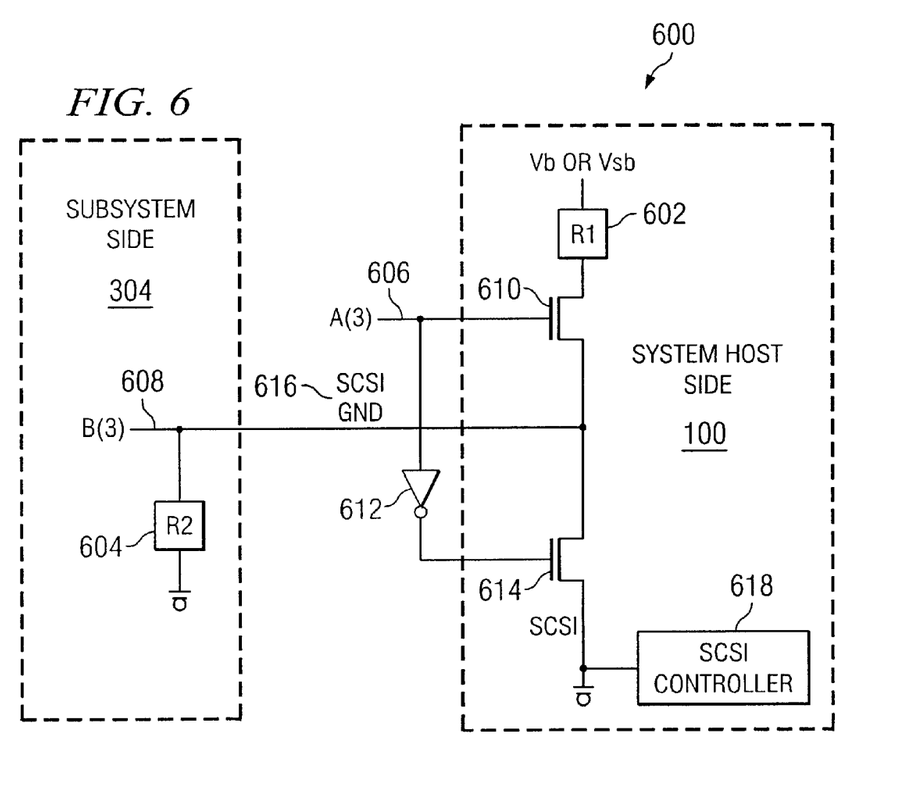
FIG. 6 is a schematic diagram of a circuit for monitoring components in a computer system in accordance with another embodiment of the present invention.

Referring now to FIG. 6, an alternate embodiment of the present invention is shown as switching circuit 600 for conducting a ground signal between subsystem 304 and computer system 100. Switching circuit 600 includes resistors 602 and 604, which form a voltage divider that establishes a voltage level indicating the status of operating power to computer system 100. When computer system 100 is receiving operating power, input signal 606 is driven low (OFF), and input signal 608 is pulled to ground. In this situation, switch 610 is OFF and inverter 612 pulls input signal 606 up to turn switch 614 ON, so that ground signal 616 is transmitted to SCSI controller 618. When computer system 100 is not receiving operating power, input signal 606 is driven high (ON), and input signal 608 has a value determined by the formula $[R2/(R1+R2)]*V_b$. In this situation, switch 610 is ON and inverter 612 pulls input signal 606 down to turn switch 614 OFF, thereby indicating that computer system 100 is not receiving operating power. In the embodiment shown, switching circuit 600 is less complex than switching circuit 500 in FIG. 5, and is a useful alternative for transmitting ground signals between subsystem 304 and computer system 100.

Advantageously, the present invention reduces eliminates the need for SMB 162, thereby saving cost and improving reliability of computer system 100 by reducing the number of components in computer system 100.

While the invention has been described with respect to the embodiments and variations set forth above, these embodiments and variations are illustrative and the invention is not to be considered limited in scope to these embodiments and variations. For example, the switching circuits may be coupled with other data busses instead of, or in addition to, SMBs and SCSI busses. Further, the present invention may be utilized when fiber optic or other data transmission devices are used instead of or in addition to serial and parallel data busses. Still further, various types of signals may be rerouted, instead of, or in addition to, signals for system management information. Accordingly, various other embodiments and modifications and improvements not described herein may be within the spirit and scope of the present invention, as defined by the following claims.

What is claimed is:

1. A method of monitoring a peripheral component coupled to a computer system comprising:

coupling a first data bus to communicate monitoring information between a sensor subsystem and the computer system;

coupling a second data bus to communicate data signals between the peripheral component and the computer system;

coupling a switch mechanism between the first data bus and the second data bus; and controlling the switch mechanism to allow monitoring information from the first data bus to be communicated over the second data bus when operating power to the computer system is off.

2. The method, as set forth in claim 1, wherein coupling the switch mechanism comprises:

coupling a first switch between the first data bus and the second data bus; and coupling a second switch to inhibit communication between the peripheral component and the computer system when operating power to the computer system is off.

3. The method, as set forth in claim 2, wherein the first data bus is a serial data bus that transmits a data signal and a clock signal.

4. The method, as set forth in claim 3, wherein the second data bus is a parallel data bus.

5. The method, as set forth in claim 4, further comprising coupling the first switch and the second switch to allow the data signal to be transmitted over the second data bus when the first switch is on and the second switch is off.

6. The method, as set forth in claim 4, further comprising coupling the first switch and the second switch to allow the clock signal to be transmitted over the second data bus when the first switch is on and the second switch is off.

7. The method, as set forth in claim 4, further comprising coupling a first switch and the second switch to allow a ground signal from the first data bus to be transmitted over the second data bus when the first switch is on and the second switch is off.

8. A method for monitoring operating parameters in an external subsystem coupled to a computer system when the computer system is not receiving operating power, the method comprising:

coupling a first data bus to communicate system management information from the external subsystem to a monitoring component in the computer system;

coupling a second data bus to transfer data between one or more peripheral components in the external subsystem and the computer system;

communicating signals representing the system management information via the second data bus when the computer system is not receiving operating power; and communicating signals between the peripheral components and the computer system via the second data bus when the computer system is receiving operating power.

9. The method, as set forth in claim 8, further comprising:

coupling a first switch between the first data bus and the second data bus; and coupling a second switch between the peripheral components and the second data bus;

wherein communicating signals representing the system management information over the second data bus includes:

controlling the first switch to allow signals from the first data bus to be communicated to the monitoring component when operating power to the computer system is off; and controlling the second switch to inhibit communication from the peripheral components on the second data bus when operating power to the computer system is off.

10. The method, as set forth in claim 9, wherein the first and second switches are coupled proximate the external subsystem and communicating signals representing the system management information over the second data bus further includes:

coupling a third switch between the second data bus and the monitoring component;

coupling a fourth switch between the second data bus and the computer system;

controlling the third switch to allow signals from the first data bus to be communicated to the monitoring component when operating power to the computer system is off; and controlling the fourth switch to inhibit communication from the peripheral components on the second data bus when operating power to the computer system is off;

wherein the third and fourth switches are coupled proximate the computer system.

11. The method, as set forth in claim 10, wherein the first data bus is a serial data bus that transmits a data signal and a clock signal.

12. The method, as set forth in claim 10, wherein the second data bus is a parallel data bus.

13. The method, as set forth in claim 12, wherein the first switch and the second switch are coupled to allow the data signal to be transmitted over the second data bus when the first switch is on and the second switch is off.

14. The method, as set forth in claim 12, wherein the first switch and the second switch are coupled to allow the clock signal to be transmitted over the second data bus when the first switch is on and the second switch is off.

15. An apparatus for monitoring a computer system comprising:

a first data bus coupled to communicate monitoring information between a sensor subsystem and the computer system;

a second data bus coupled to communicate data signals between the peripheral component and the computer system;

a switch mechanism coupled between the first data bus and the second data bus, the switch mechanism being operable to allow monitoring information from the first data bus to be communicated over the second data bus when operating power to the computer system is off.

16. The apparatus, as set forth in claim 15, wherein the switch mechanism comprises:

a first switch coupled between the first data bus and the second data bus; and a second switch connected to inhibit communication between the peripheral component and the computer system when operating power to the computer system is off.

17. The apparatus, as set forth in claim 16, wherein the first data bus is a serial data bus that transmits a data signal and a clock signal.

18. The apparatus, as set forth in claim 17, wherein the second data bus is a parallel data bus.

19. The apparatus, as set forth in claim 18, wherein the first switch and the second switch are coupled to allow the data signal to be transmitted over the second data bus when the first switch is on and the second switch is off.

20. The apparatus, as set forth in claim 18, wherein the first switch and the second switch are coupled to allow the clock signal to be transmitted over the second data bus when the first switch is on and the second switch is off.

21. The apparatus, as set forth in claim 18, wherein the first switch and the second switch are coupled to allow a ground signal from the first data bus to be transmitted over the second data bus when the first switch is on and the second switch is off.

22. A computer system having an apparatus for monitoring operating parameters in the computer system, the computer system including a system management bus controller and a data bus controller, the computer system being coupled to a subsystem, wherein the subsystem includes a peripheral component and a sensor system, the apparatus comprising:

a first data bus coupled to communicate information from the sensor system to the system management bus controller;

a second data bus coupled to communicate information from the peripheral component to the data bus controller;

a first switch mechanism coupled between the peripheral component and the sensor system, the first switch mechanism being operable to allow signals from the first data bus to be communicated over the second data bus when operating power to the computer system is off; and a second switch mechanism coupled between the system management bus controller and the data bus controller, the second switch mechanism being operable to allow signals from the second data bus to be communicated to the system management bus controller when operating power to the computer system is off.

23. The computer system, as set forth in claim 22, wherein the first switch mechanism comprises:

a first switch coupled between the first data bus and the second data bus; and a second switch coupled to inhibit communication from the peripheral component when operating power to the computer system is off.

24. The computer system, as set forth in claim 23, wherein the second switch mechanism comprises:

a third switch coupled between the second data bus and the system management bus controller; and a fourth switch coupled between the second data bus and the data bus controller to inhibit communication from the second data bus to the data bus controller when operating power to the computer system is off.

25. The computer system, as set forth in claim 24, wherein the first data bus is a serial data bus that transmits a data signal and a clock signal.

26. The computer system, as set forth in claim 25, wherein the second data bus is a parallel data bus.

27. The computer system, as set forth in claim 26, wherein the first switch and the second switch are coupled to allow the data signal to be transmitted over the second data b us when the first switch is on and the second switch is off.

28. The computer system, as set forth in claim 26, wherein the first switch and the second switch are coupled to allow the clock signal to be transmitted over the second data bus when the first switch is on and the second switch is off.

29. The computer system, as set forth in claim 26, wherein the first switch and the second switch are coupled to allow a ground signal from the first data bus to be transmitted over the second data bus when the first switch is on and the second switch is off.

30. An apparatus for monitoring operating parameters in a computer system, the computer system including a data bus controller and a system management controller, the apparatus comprising:

a first data bus coupled to communicate information from a subsystem to the computer system;

a switch mechanism coupled between the data bus controller and the system management controller, the switch mechanism being operable to allow signals from the subsystem to be communicated to the data bus controller when operating power to the computer system is on, the switch mechanism being further operable to allow signals from the subsystem to be communicated to the system management controller when operating power to the computer system is off; and a voltage divider coupled between the computer system and the subsystem, the voltage divider being operable to provide a signal indicative of the computer system's power status.

* * * * *